United States Patent
Augsburg et al.

(10) Patent No.: US 6,826,656 B2
(45) Date of Patent: Nov. 30, 2004

(54) REDUCING POWER IN A SNOOPING CACHE BASED MULTIPROCESSOR ENVIRONMENT

(75) Inventors: Victor Roberts Augsburg, Cary, NC (US); James Norris Dieffenderfer, Apex, NC (US); Bernard Charles Drerup, Austin, TX (US); Richard Gerard Hofmann, Apex, NC (US); Thomas Andrew Sartorius, Raleigh, NC (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 10/059,537

(22) Filed: Jan. 28, 2002

(65) Prior Publication Data

US 2003/0145174 A1 Jul. 31, 2003

(51) Int. Cl.[7] .............................................. G06F 12/08
(52) U.S. Cl. ...................... 711/144; 711/146; 711/145; 711/141; 711/120; 711/124; 711/129
(58) Field of Search ................................. 711/147, 146, 711/144, 145, 141, 119, 120, 121, 124, 129, 173

(56) References Cited

U.S. PATENT DOCUMENTS

| | | | | |
|---|---|---|---|---|
| 3,840,862 A | * | 10/1974 | Ready | ......................... 711/128 |
| 4,322,795 A | * | 3/1982 | Lange et al. | ................. 711/136 |
| 5,155,831 A | * | 10/1992 | Emma et al. | ................ 711/121 |
| 5,247,648 A | | 9/1993 | Watkins et al. | |
| 5,542,066 A | | 7/1996 | Mattson et al. | |
| 5,546,559 A | * | 8/1996 | Kyushima et al. | ........... 711/133 |
| 5,553,307 A | | 9/1996 | Fujii et al. | |
| 5,604,882 A | * | 2/1997 | Hoover et al. | ............... 711/121 |
| 5,958,078 A | | 9/1999 | Yamamoto et al. | .......... 714/766 |
| 6,393,522 B1 | * | 5/2002 | Campbell | .................... 711/120 |
| 6,393,524 B1 | * | 5/2002 | Ayers | ......................... 711/133 |

* cited by examiner

Primary Examiner—B. James Peikari
(74) Attorney, Agent, or Firm—Robert A. Voigt, Jr.; Winstead Sechrest & Minick P.C.; Scott W. Reid

(57) ABSTRACT

A method and system for reducing power in a snooping cache based environment. A memory may be coupled to a plurality of processing units via a bus. Each processing unit may comprise a cache controller coupled to a cache associated with the processing unit. The cache controller may comprise a segment register comprising N bits where each bit in the segment register may be associated with a segment of memory divided into N segments. The cache controller may be configured to snoop a requested address on the bus. Upon determining which bit in the segment register is associated with the snooped requested address, the segment register may determine if the bit associated with the snooped requested address is set. If the bit is not set, then a cache search may not be performed thereby mitigating the power consumption associated with a snooped request cache search.

27 Claims, 4 Drawing Sheets

REDUCING POWER IN A SNOOPING CACHE BASED MULTIPROCESSOR ENVIRONMENT

TECHNICAL FIELD

The present invention relates to the field of snooping in a multiprocessor environment, and more particularly to not performing a cache search when a copy of the snooped requested address is determined to not be in the cache thereby mitigating the power consumption associated with a snooped request cache search.

BACKGROUND INFORMATION

A multiprocessor system may comprise multiple processors coupled to a common shared system memory. Each processor may comprise one or more levels of cache memory. The multiprocessor system may further comprise a system bus coupling the processing elements to each other and to the system memory. A cache memory may refer to a relatively small, high-speed memory that contains a copy of information from one or more portions of the system memory. Frequently, the cache memory is physically distinct from the system memory. Such a cache memory may be integral with a processor in the system, commonly referred to as an L1 cache, or may be non-integral with a processor in the system, commonly referred to as an L2 cache.

A cache may be organized as a collection of spatially mapped, fixed size storage region pools commonly referred to as "rows." Each of these storage region pools typically comprises one or more storage regions of fixed granularity. These storage regions may be freely associated with any equally granular storage region in the system as long as the storage region spatially maps to the row containing the storage region pool. The position of the storage region within the pool may be referred to as the "column." The intersection of each row and column contains a cache line. The size of the storage granule may be referred to as the "cache line size." A unique tag may be derived from an address of a given storage granule to indicate its residency in a given row/column position.

When a processor generates a read request and the requested data resides in its cache memory, e.g., L1 cache, then a cache read hit takes place. The processor may then obtain the data from the cache memory without having to access the system memory. If the data is not in the cache memory, then a cache read miss occurs. The memory request may be forwarded to the system and the data may subsequently be retrieved from the system memory as would normally be done if the cache did not exist. On a cache miss, the data that is retrieved from the system memory may be provided to the processor and may also be written into the cache memory due to the statistical likelihood that this data will be requested again by that processor. Likewise, if a processor generates a write request, the write data may be written to the cache memory without having to access the system memory over the system bus.

Hence, data may be stored in multiple locations, e.g., L1 cache of a particular processor and system memory. If a processor altered the contents of a system memory location that is duplicated in its cache memory, the cache memory may be said to hold "stale" or invalid data. Problems may result if the processor inadvertently obtained this invalid data. Subsequently, it may be desirable to ensure that data is consistent between the system memory and caches. This may commonly be referred to as "maintaining cache coherency." In order to maintain cache coherency, therefore, it may be necessary to monitor the system bus when the processor does not control the bus to see if another processor accesses system memory. This method of monitoring the bus is referred to in the art as "snooping."

Each cache may be associated with snooping logic configured to monitor the bus for the addresses requested by a processor. The snooping logic may further be configured to determine if a copy of the requested address is within the associated cache using a protocol commonly referred to as Modified, Exclusive, Shared and Invalid (MESI). That is, the snooping logic may be required to search its associated cache for a copy of the requested address. If the cache contains the specified address (and data) then depending on the type of request and the state of the data within the cache, the snooping logic may be required to perform a particular type of action, e.g., invalidating and/or flushing the data to the shared system memory. However, as is often the case, the requested copy of the address may not be found within the cache and subsequently no action is required.

Performing a cache search consumes a significant amount of power regardless of whether a copy of the snooped requested address is found within the cache. Subsequently, unnecessary power may be consumed when a cache search is performed to search for a copy of the snooped requested address that is not found within the cache.

It would therefore be desirable to not perform a cache search when a copy of the snooped requested address is determined to not be in the cache thereby mitigating the power consumption associated with a snooped request cache search.

SUMMARY

The problems outlined above may at least in part be solved in some embodiments by a segment register storing N bits where each bit may be associated with a segment of memory divided into N segments. It is noted that N may be any number. A segment of memory may represent a range of addresses where data is stored in memory. Upon snooping a requested address on a bus by a cache controller coupled to a cache, a determination may be made as to whether the bit in the segment register associated with the segment of memory comprising the address of the request is set. A set bit is an indication that data may be contained in the cache within the segment address associated with that bit. Subsequently, if the bit associated with the snooped requested address is set, a cache search for the snooped requested address may be performed within the cache. However, a bit that is not set is an indication that no data is contained in the cache within the segment address associated with that bit. Subsequently, if the bit associated with the snooped requested address is not set, then a cache search may be avoided thereby mitigating the power consumption associated with a snooped request cache search.

In one embodiment of the present invention, a memory configured to store data may be coupled to a plurality of processing units via a bus. Each processing unit may comprise a processor and a cache controller coupled to a cache associated with the processing unit. The cache controller may comprise a segment register comprising N bits where each bit in the segment register may be associated with a segment of memory divided into N segments. It is noted that N may be any number. The cache controller may further comprise snooping logic configured to snoop a request to read from or write to a particular memory address on the bus that may be issued from a processor in another processing unit. The snooping logic may further be configured to determine which bit in the segment register is associated with the segment address that includes the snooped requested address. Upon determining which bit in the segment register is associated with the snooped requested address, the snooping logic may be configured to determine if the bit associated with the snooped requested address is set. A set bit is an indication that data may be contained in the cache within the segment address associated with that bit. Subsequently, if the bit associated with the snooped requested address is set, a cache search for the snooped requested address may be performed within the cache. However, a bit that is not set is an indication that no data is contained in the cache within the segment address associated with that bit. Subsequently, if the bit associated with the snooped requested address is not set, then a cache search may not be performed thereby mitigating the power consumption associated with a snooped request cache search.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
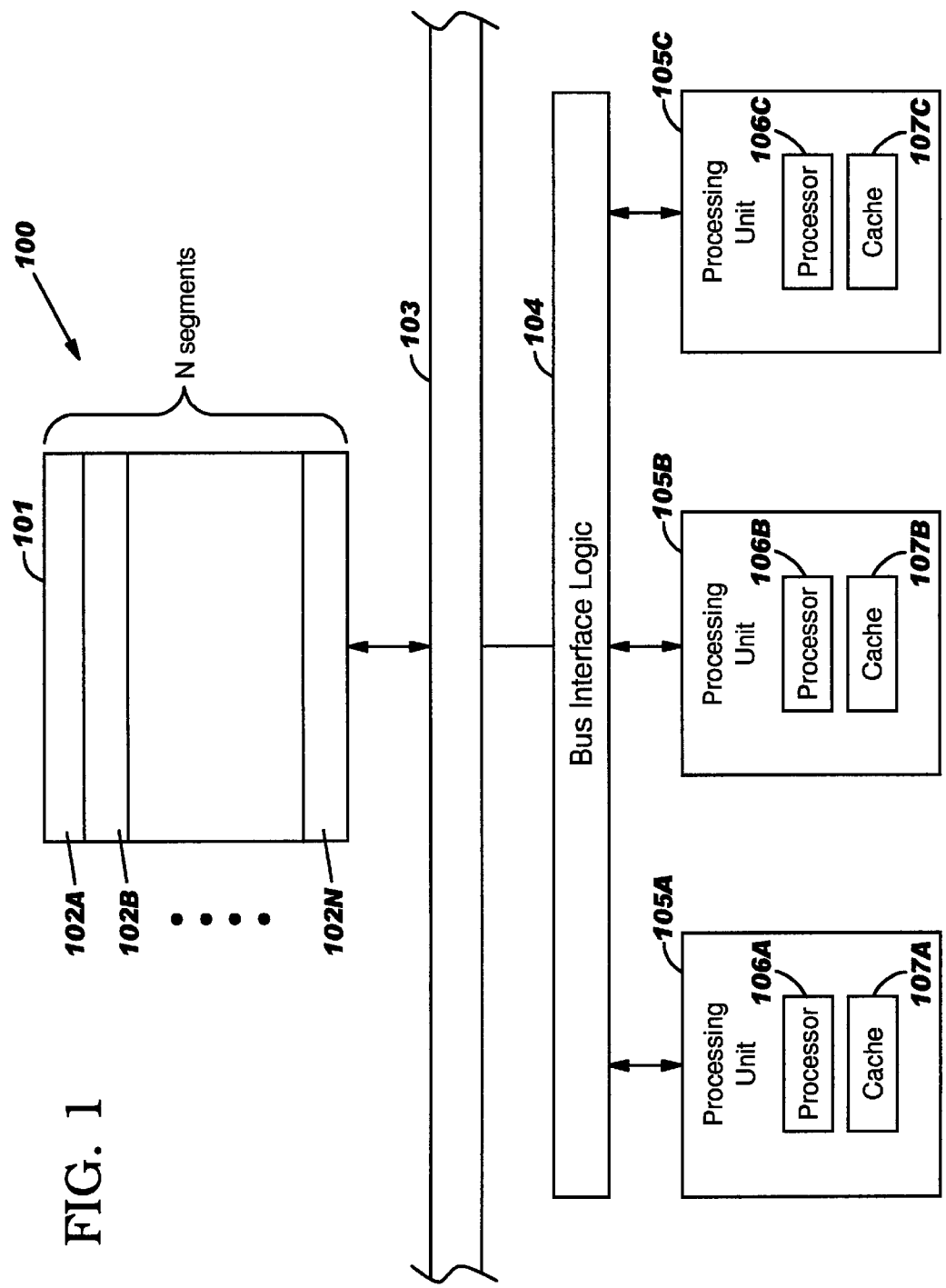
FIG. 1 illustrates a multiprocessor system configured in accordance with the present invention.

FIG. 1—Multiprocessor System

FIG. 1 illustrates an embodiment of a multiprocessor system 100 in accordance with the present invention. System 100 may comprise a memory 101 configured to store data. Referring to FIG. 1, memory 101 may be divided into N segments, e.g., segments 102A–102N, where N may be any number. Segments 102A–N may collectively or individually be referred to as segments 102 or segment 102, respectively. Each segment 102 may represent a range of addresses where data is stored. System 100 may further comprise a plurality of processing units 105A–C coupled to memory 101 via a bus 103. Processing units 105A–C may be interfaced to bus 103 via a bus interface logic unit 104. Processing units 105A–C may collectively or individually be referred to as processing units 105 or processing unit 105, respectively. Processing unit 105 may be configured to read from or write to memory 101 by issuing requests to read from or write to memory 101 on bus 103 via bus interface logic unit 104. Furthermore, each processing unit 105 may be configured to communicate with another processing unit 105 via bus interface logic unit 104. It is noted that system may comprise any number of processing units 105 and that memory 101 may be divided into any number of segments. It is further noted that FIG. 1 is illustrative.

Referring to FIG. 1, processing unit 105A may comprise a processor 106A and a cache 107A, e.g., level one (L1) cache such as an L1 instruction/data cache. Cache 107A may be configured to contain instruction and data values that may be repeatedly accessed by processor 106A. It is noted that those skilled in the art will recognize that multiple caches, e.g., L1 instruction cache, L1 data cache, may be implemented instead of a unified cache. Processing units 105B and 105C are similarly configured. For example, processing unit 105B may comprise a processor 106B and a cache 107B configured similarly as processor 106A and cache 107A, respectively. Processing unit 105C may comprise a processor 106C and a cache 107C configured similarly as processor 106A and cache 107A, respectively. Processors 106A–C may collectively or individually be referred to as processors 106 or processor 106, respectively. Caches 107A–C may collectively or individually be referred to as caches 107 or cache 107, respectively.

It is noted that processing unit 105 may be coupled to any number of cache levels that may be located externally to processing unit 105. For example, one or more additional levels of cache memory may be coupled externally to processing unit 105 to minimize data access latency. A processing unit 105 may be configured to be coupled to a level two (L2) cache located externally to processing unit 105. The L2 cache may be employed to stage data to an L1 cache, e.g., cache 107A. A more detailed description of processing unit 105 is provided below in conjunction with FIG. 2.

Figure 2:
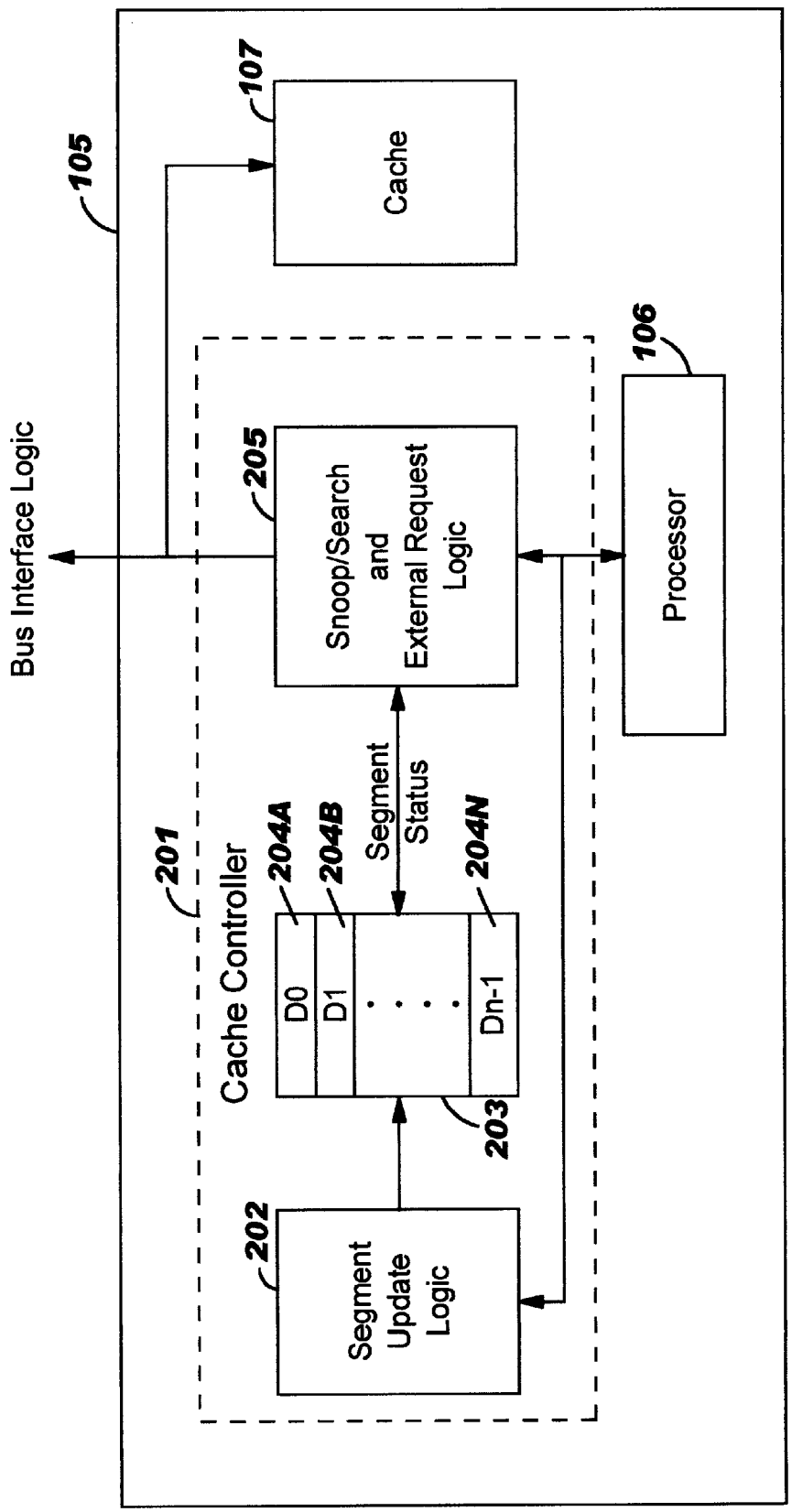
FIG. 2 illustrates a processing unit in a multiprocessor system configured in accordance with the present invention.

FIG. 2—Processing Unit

FIG. 2 illustrates an embodiment of the present invention of processing unit 105. Processing unit 105 may comprise processor 106 and cache 107 as discussed above. Processing unit 105 may further comprise a cache controller 201 coupled to cache 107 and processor 106. Cache controller 201 may be configured to manage accesses to cache 107. It is noted that additional levels of caches, e.g., L2 cache, coupled to processing unit 105 may comprise their own cache controllers configured to function similarly as cache controller 201. It is further noted that even though the following discusses the present invention in conjunction with cache controller 201 managing accesses to cache 107 that the discussion may be applicable to any cache controller managing accesses to its associated cache located external to processing unit 105. It is further noted that such embodiments employing a cache controller managing accesses to its associated cache located external to processing unit 105 would fall within the scope of the present invention.

Referring to FIG. 2, cache controller 201 may comprise a segment update logic unit 202 coupled to a segment register 203 which may be coupled to a snoop/search and external request logic unit 205. Snoop/search and external request logic unit 205 may be coupled to processor 106, cache 107 and bus interface logic unit 104. Segment update logic unit 105 may be coupled to processor 106.

Segment register 203 may be configured to comprise N bits, e.g., bits 204A–N, where N is equal to the number of segments divided in memory 101 (FIG. 1). Bits 204A-N may collectively or individually be referred to as bits 204 or bit 204, respectively. Each bit 204 may be associated with a particular segment in memory 101. For example, bit 204A may be associated with segment 102A in memory 101. Bit 204B may be associated with segment 102B in memory 101 and so forth. Furthermore, each bit 204 may indicate whether cache 107 contains any data within the address segment associated with bit 204. That is, each bit 204 may indicate whether cache 107 contains a copy of an address within the address segment associated with bit 204. At reset, each bit 204 may be initialized, e.g., bit 204 contains a zero, indicating that cache 107 does not contain any data. As data is stored in cache 107, the corresponding bit 204 may be set, e.g., bit 204 may be set to the binary value of 1. The corresponding bit 204 may be set to indicate that cache 107 contains data within the address segment that is associated with the set bit 204. It is noted that any value of bit 204, e.g., zero or one, may indicate whether cache 107 contains data with the complementary value indicating that the cache does not contain data within the address segment that is associated with bit 204.

Referring to FIG. 2, snoop/search and external request logic unit 205 may be configured to receive a request to read from or write to a particular memory address issued from processor 106. Upon snoop/search and external request logic unit 205 receiving a request to read from or write to a particular memory address issued from processor 106, snoop/search and external request logic unit 205 may be configured to search cache 107 for a copy of the requested address. If there is a cache miss, then snoop/search and external request logic unit 205 may be configured to transmit the request received from processor 106 to bus 103 (FIG. 1) via bus interface logic unit 104. If there is a cache hit, then snoop/search and external request logic unit 205 may be configured to service the request in cache 107.

Segment update logic unit 202 may also be configured to receive the request to read from or write to a particular memory address issued from processor 106. Upon segment update logic unit 202 receiving the request issued from processor 106, segment update logic unit 202 may be configured to determine which bit 204 of segment register 203 is associated with the request. For example, if memory 101 is divided into 32 segments, then segment register 203 may comprise 32 bits 204. Subsequently, segment update logic unit 202 may determine which bit 204 is associated with the request based on the value in the five upper order bits of the request. That is, segment update logic 202 may determine which bit 204 represents a segment address that contains the address of the request based on the value in the five upper order bits of the request. For example, if the upper five order bits in the request had a binary value of 00000 (decimal value of 0), then the first bit 204, e.g., bit 204A, is the bit 204 associated with the request. Upon determining which bit 204 is associated with the request, segment update logic 202 may be configured to determine if the corresponding bit 204 is in a first state, e.g., set, or in a second state, e.g., not set. That is, segment update logic 202 may be configured to determine if cache 107 may contain a copy of the requested address (and associated data). If the corresponding bit 204 is set, then segment register 203 is not updated. However, if the corresponding bit 204 is not set, then segment update logic 202 may be configured to update segment register 203 by setting the corresponding bit 204, e.g., bit 204A. Segment update logic 202 may set the corresponding bit 204, e.g., bit 204A, to indicate that cache 107 may contain data at an address within the segment address associated with the set bit 204. That is, by setting bit 204, snoop/search and external request logic 205 may at a later time be able to determine that cache 107 may contain data within the address segment associated with the set bit 204, e.g., bit 204A, as explained in additional detail below. A method for setting the corresponding bit 204 in segment register 203 by segment update logic 202 is described in conjunction with FIG. 3.

Snoop/search and external request logic 205 may further be configured to snoop a request on bus 103 issued by another processor 106 of another processing unit 105. Once snoop/search and external request logic 205 snoops a request on bus 103, snoop/search and external request logic 205 may be configured to determine which bit 204 is associated with the snooped requested address. As stated above, in one embodiment, bit 204 associated with the snooped requested address may be determined by the value in the upper order bits. Once snoop/search and external request logic 205 determines which bit 204 is associated with the snooped request, snoop/search and external request logic 205 may be configured to determine if bit 204 associated with the snooped requested address is set. If bit 204 associated with the snooped requested address is not set, then cache 107 associated with segment register 203 does not contain any data within the segment address associated with bit 204. Since there is no data contained in cache 107 associated with the snooped requested address, a cache search of cache 107 may not be performed by snoop/search and external request logic 205 thereby mitigating the power consumption associated with a snooped request cache search. If, however, bit 204 associated with the snooped address request is set, then snoop/search and external request logic 205 performs a cache search for the snooped requested address in cache 107. A method for reducing power consumption in a snooping cache based environment by not performing a cache search for a snooped requested address when there is no data contained in the cache associated with the snooped requested address is described in conjunction with FIG. 4 further below.

Figure 3:
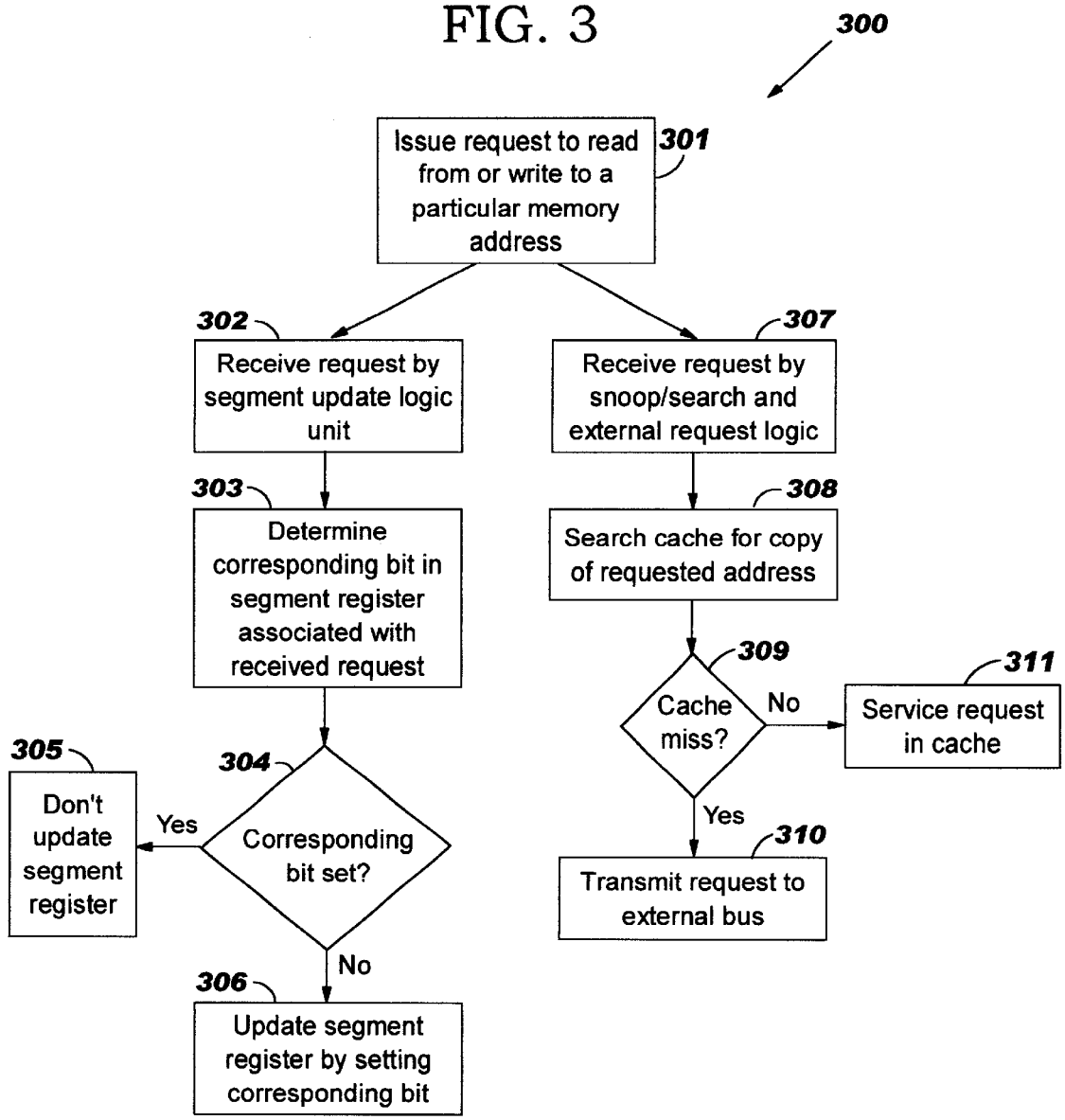
FIG. 3 is a flowchart of a method for updating a segment register as well as transmitting a request issued from a processor to an external bus in accordance with the present invention.

FIG. 3—Method for Updating Segment Register as well as Transmitting Issued Request from Processor to External Bus Turning first to FIG. 3, FIG. 3 is a flowchart of one embodiment of the present invention of a method 300 for updating segment register 203 (FIG. 2) as well as transmitting an issued request from processor 106 (FIG. 2) to external bus 103 (FIG. 1). It is noted that steps 302–306 in method 300 may be executed in a substantially simultaneous manner with steps 307-310 as illustrated in FIG. 3.

In step 301, a request to read from or write to a particular memory address may be issued by processor 106 in a particular processing unit 105. In step 302, the request may be received by segment update logic unit 202 (FIG. 2). Upon segment update logic unit 202 receiving the request issued from processor 106, segment update logic unit 202 may determine which bit 204 (FIG. 2) in segment register 203 corresponds with the received request in step 303. That is, segment update logic unit 202 may determine which bit 204 in segment register 203 corresponds with a segment address that includes the address of the request. In one embodiment, segment update logic unit 202 may be configured to determine which bit 204 corresponds with the received request by the value in the upper order bits of the request as described above. In step 304, a determination may be made by segment update logic unit 202 as to whether bit 204 corresponds with the received request is set. If bit 204 corresponding with the received request is set, then segment register 203 is not updated in step 305. If, however, bit 204, e.g., bit 204A, corresponding with the received request is not set, then segment register 203 is updated by segment update logic unit 202 setting bit 204, e.g., bit 204A, corresponding with the received request in step 306. By setting bit 204, e.g., bit 204A, corresponding with the received request, snoop/search and external request logic 205 (FIG. 2) may at a later time perform a cache search in cache 107 (FIG. 2) for a snooped requested address with an address in the address segment associated with bit 204, e.g., bit 204A, since cache 107 may comprise data associated with the snooped requested address as explained in additional detail in FIG. 4.

Returning to step 301 of FIG. 3, snoop/search and external request logic unit 205 may be configured to receive the issued request from processor 106 in step 307. Upon snoop/search and external request logic unit 205 receiving the issued request from processor 106, a cache search of cache 107 may be performed for a copy of the requested address in step 308. A determination may then be made in step 309 as to whether there is a cache miss by snoop/search and external request logic unit 205. If there is a cache miss, then in step 310 the request issued from processor 106 may be transmitted to bus 103 via bus interface logic unit 104 (FIG. 1) by snoop/search and external request logic unit 205. If there is a cache hit, then the received request may be serviced by snoop/search and external request logic unit 205 in cache 107 in step 311.

It is noted that method 300 may be executed in a different order presented and that the order presented in the discussion of FIG. 3 is illustrative. It is further noted that certain steps in method 300 may be executed in a substantially simultaneous manner, e.g., steps 302–306 may be executed in a substantially simultaneous manner with steps 307–310.

Figure 4:
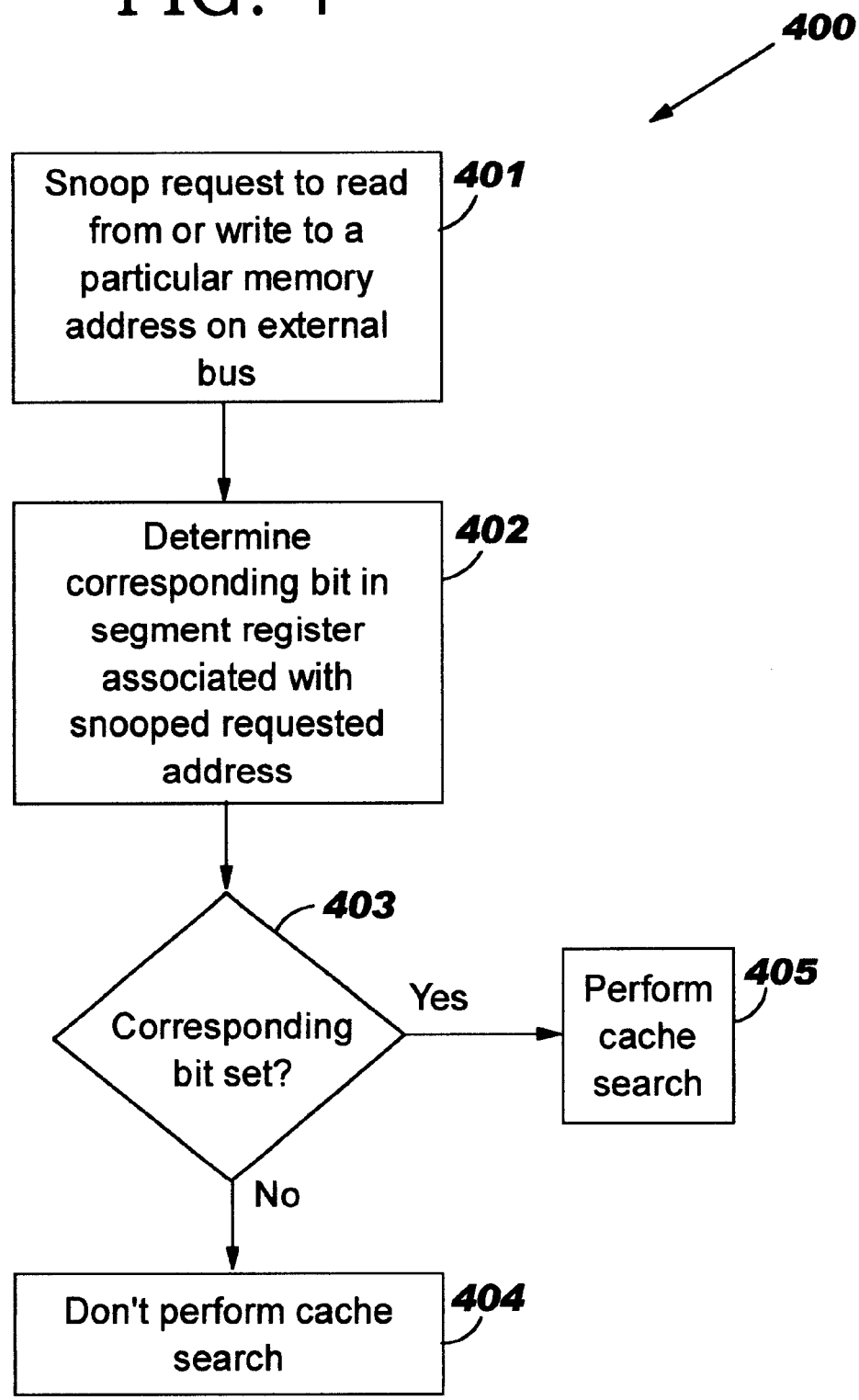
FIG. 4 is a flowchart of a method for reducing power in a snooping cache based environment in accordance with the present invention.

FIG. 4—Method for Reducing Power in a Snooping Cache Based Environment

FIG. 4 is a flowchart of one embodiment of the present invention of a method 400 for reducing power in a snooping cache based environment. As stated in the Background Information section, each cache may be associated with snooping logic configured to monitor the bus for the addresses requested by a processor. The snooping logic may further be configured to determine if a copy of the requested address is within the associated cache using a protocol commonly referred to as Modified, Exclusive, Shared and Invalid (MESI). If the cache contains the specified address (and data) then depending on the type of request and the state of the data within the cache, the snooping logic may be required to perform a particular type of action, e.g., invalidating and/or flushing the data to the shared system memory. However, as is often the case, the requested copy of the address may not be found within the cache and subsequently no action is required. Performing a cache search consumes a significant amount of power regardless of whether a copy of the snooped requested address is found within the cache. Subsequently, unnecessary power may be consumed when a cache search is performed to search for a copy of the snooped requested address that is not found within the cache. It would therefore be desirable to not perform a cache search when a copy of the snooped requested address is determined to not be in the cache thereby mitigating the power consumption associated with a snooped request cache search. Method 400 is a method for not performing a cache search when a copy of the snooped requested address is determined to not be in the cache thereby mitigating the power consumption associated with a snooped request cache search.

Referring to FIGS. 1, 2 and 4, in step 401, a request to read from or write to a particular memory address issued by processor 106 of processing unit 105, e.g., processing unit 105A, may be snooped on bus 103 by snoop/search and external request logic 205 of a different processing unit 105, e.g., processing unit 105B. As stated above, a request to read from or write to a particular memory address from processor 106 of processing unit 105, e.g., processing unit 105A, may be issued on bus 103 by snoop/search and external request logic 205 of that same processing unit 105, e.g., processing unit 105A, upon there being a cache miss. Once snoop/search and external request logic 205 snoops a request on bus 103, a determination may be made by snoop/search and external request logic 205 in step 402 as to which bit 204 is associated with the snooped requested address. As stated above, in one embodiment, the corresponding bit 204 associated with the snooped requested address may be determined by the value in the upper order bits. A determination may be made in step 403 as to whether the corresponding bit 204 associated with the snooped requested address is set. If bit 204 associated with the snooped address request is not set, then a cache search of cache 107 is not performed by snoop/search and external request logic 205 in step 404 thereby mitigating the power consumption associated with a snooped request cache search. A cache search of cache 107 may not be performed since bit 204 associated with the snooped requested address indicates that a copy of the address (and associated data) is not contained in cache 107. If, however, bit 204 associated with the snooped requested address is set, then a cache search for the snooped requested address in cache 107 may be performed in step 405 by snoop/search and external request logic 205.

It is noted that method 400 may be executed in a different order presented and that the order presented in the discussion of FIG. 4 is illustrative. It is further noted that certain steps in method 400 may be executed in a substantially simultaneous manner.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for reducing power in a snooping cache based environment comprising the steps of:

snooping on a bus for a requested address;

determining a corresponding bit in a register associated with said snooped requested address; and determining if said corresponding bit in said register associated with said snooped requested address is set;

wherein if said corresponding bit in said register associated with said snooped requested address is not set, then a cache search is not performed.

2. The method as recited in claim 1, wherein if said corresponding bit in said register associated with said snooped requested address is set, then said cache search is performed.

3. The method as recited in claim 1, wherein said corresponding bit in said register is associated with a particular segment of a system memory.

4. A method for reducing power in a snooping cache based environment comprising the steps of:

receiving a request to access a memory address;

determining a corresponding bit in a register associated with said requested memory address, wherein said register comprises a plurality of bits, wherein each bit in said register is associated with a segment of a system memory; and determining if said corresponding bit in said register associated with said requested memory address is set.

5. The method as recited in claim 4 further comprising the step of:

updating said register by setting said corresponding bit in said register associated with said requested memory address if said corresponding bit is not set.

6. The method as recited in claim 4, wherein if said corresponding bit is set then said register is not updated.

7. The method as recited in claim 4 further comprising the steps of:

snooping on a bus for a requested address;

determining a corresponding bit in said register associated with said snooped requested address; and determining if said corresponding bit in said register associated with said snooped requested address is set;

wherein if said corresponding bit in said register associated with said snooped requested address is not set, then a cache search is not performed.

8. The method as recited in claim 7, wherein if said corresponding bit in said register associated with said snooped requested address is set, then said cache search is performed.

9. A system, comprising:

a memory configured to store data; and a plurality of processing units coupled to said memory via a bus, wherein a processing unit comprises:

a cache controller coupled to a cache memory associated with said processing unit, wherein said cache controller is configured to manage access to said cache memory, wherein said controller comprises is configured to snoop on said bus for a requested address issued from another processing unit of said system, wherein said cache controller is further configured to determine a corresponding bit in a register associated with said snooped requested address, wherein said cache controller is further configured to determine if said corresponding bit in said register associated with said snooped requested address is set, wherein if said corresponding bit in said register associated with said snooped requested address is not set, then a cache search of said cache memory is not performed.

10. The system as recited in claim 9, wherein if said corresponding bit in said register associated with said snooped requested address is set, then said cache controller performs a cache search of said cache memory associated with said processing unit.

11. The system as recited in claim 9, wherein said corresponding bit in said register is associated with a particular segment of said memory.

12. A system, comprising:

a memory configured to store data;

a plurality of processing units coupled to said memory via a bus; and a bus interface unit coupling said plurality of processing units to said bus, wherein each of said plurality of processing units is configured to communicate to another processing unit via said bus interface unit, wherein a processing unit comprises:

a processor; and a cache controller coupled to said processor and a cache memory associated with said processing unit, wherein said cache controller is configured to receive a request to access a memory address issued from said processor, wherein said cache controller is configured to determine a corresponding bit in a register associated with said requested memory address, wherein said cache controller is further configured to determine if said corresponding bit in said register associated with said requested memory address is set.

13. The system as recited in claim 12, wherein said cache controller is further configured to update said register by setting said corresponding bit in said register associated with said requested memory address if said corresponding bit is not set.

14. The system as recited in claim 12, wherein if said corresponding bit is set then said cache controller does not update said register.

15. The system method as recited in claim 12, wherein said cache controller is further configured to snoop on said bus for a requested address issued from another processing unit of said system, wherein said cache controller is further configured to determine a corresponding bit in a register associated with said snooped requested address, wherein said cache controller is further configured to determine if said corresponding bit in said register associated with said snooped requested address is set, wherein if said corresponding bit in said register associated with said snooped requested address is not set, then a cache search of said cache memory associated with said processing unit is not performed by said cache controller.

16. The system as recited in claim 15, wherein if said corresponding bit in said register associated with said snooped requested address is set, then said cache controller performs a cache search of said cache memory associated with said processing unit.

17. A system, comprising:

a memory configured to store data; and a plurality of processing units coupled to said memory via a bus, wherein a processing unit comprises:

means for managing an access to a cache memory associated with said processing unit;

means for snooping on said bus for a requested address issued from another processing unit of said system;

means for determining a corresponding bit in a register associated with said snooped requested address; and means for determining if said corresponding bit in said register associated with said snooped requested address is set, wherein if said corresponding bit in said register associated with said snooped requested address is not set, then a cache search of said cache memory is not performed.

18. The system as recited in claim 17, wherein if said corresponding bit in said register associated with said snooped requested address is set, then said processing unit further comprises:

means for performing a cache search of said cache memory associated with said processing unit.

19. The system as recited in claim 17, wherein said corresponding bit in said register is associated with a particular segment of said memory.

20. A system, comprising:

a memory configured to store data;

a plurality of processing units coupled to said memory via a bus; and a bus interface unit coupling said plurality of processing units to said bus, wherein each of said plurality of processing units is configured to communicate to another processing unit via said bus interface unit, wherein a processing unit comprises:

a processor;

means for receiving a request to access a memory address issued from said processor;

means for determining a corresponding bit in a register associated with said requested memory address; and means for determining if said corresponding bit in said register associated with said requested memory address is set.

21. The system as recited in claim 20, wherein said processing unit further comprises:

means for updating said register by setting said corresponding bit in said register associated with said requested memory address if said corresponding bit is not set.

22. The system as recited in claim 20, wherein if said corresponding bit is set then said register is not updated.

23. The system method as recited in claim 20, wherein said processing unit further comprises:

means for managing an access to a cache memory associated with said processing unit;

means for snooping on said bus for a requested address issued from another processing unit of said system;

means for determining a corresponding bit in a register associated with said snooped requested address; and means for determining if said corresponding bit in said register associated with said snooped requested address is set, wherein if said corresponding bit in said register associated with said snooped requested address is not set, then a cache search of said cache memory is not performed.

24. The system as recited in claim 23, wherein if said corresponding bit in said register associated with said snooped requested address is set, then said processing unit further comprises:

means for performing a cache search of said cache memory associated with said processing unit.

25. A method for reducing power in a snooping cache based environment comprising the steps of:

snooping on a bus for a requested address;

determining a corresponding bit in a register associated with said snooped requested address; and determining if said corresponding bit in said register associated with said snooped requested address is set;

wherein if said corresponding bit in said register associated with said snooped requested address is not set, then no portion of a cache will be searched.

26. A system, comprising:

a memory configured to store data; and a plurality of processing units coupled to said memory via a bus, wherein a processing unit comprises:

a cache controller coupled to a cache memory associated with said processing unit, wherein said cache controller is configured to manage access to said cache memory, wherein said controller comprises is configured to snoop on said bus for a requested address issued from another processing unit of said system, wherein said cache controller is further configured to determine a corresponding bit in a register associated with said snooped requested address, wherein said cache controller is further configured to determine if said corresponding bit in said register associated with said snooped requested address is set, wherein if said corresponding bit in said register associated with said snooped requested address is not set, then no portion of said cache memory will be searched.

27. A system, comprising:

a memory configured to store data; and a plurality of processing units coupled to said memory via a bus, wherein a processing unit comprises:

means for managing an access to a cache memory associated with said processing unit;

means for snooping on said bus for a requested address issued from another processing unit of said system;

means for determining a corresponding bit in a register associated with said snooped requested address; and means for determining if said corresponding bit in said register associated with said snooped requested address is set, wherein if said corresponding bit in said register associated with said snooped requested address is not set, then no portion of said cache memory will be searched.

* * * * *